Sept. 24, 1963   B. WALTERSCHEID-MÜLLER   3,104,536
PROTECTIVE DEVICE FOR UNIVERSAL-JOINT SHAFTS Filed March 27, 1961   3 Sheets-Sheet 1

Inventor
BERNHARD WALTERSCHEID-MÜLLER

By Toulmin & Toulmin
Attorneys

Inventor
BERNHARD WALTERSCHEID-MÜLLER

By Toulmin & Toulmin
Attorneys

United States Patent Office 3,104,536
Patented Sept. 24, 1963

3,104,536
PROTECTIVE DEVICE FOR UNIVERSAL-JOINT SHAFTS
Bernhard Walterscheid-Müller, Lohmar, Rhineland, Germany, assignor to Jean Walterscheid, KG, Lohmar, Germany
Filed Mar. 27, 1961, Ser. No. 98,627
Claims priority, application Germany Apr. 9, 1960
1 Claim. (Cl. 64—32)

The present invention relates to a protective end piece for universal-joint shafts which yields to external pressure.

The invention essentially comprises a funnel-shaped or cylindrical end piece which is adapted to be resiliently deformed by or to yield to pressure exerted in axial direction. This protective device is primarily intended to be used in connection with universal-joint shafts of agricultural machines.

Numerous forms of funnel-shaped protective end pieces for universal joints of resilient materials have been proposed. They have the advantage to yield to external axial and radial forces without being deformed permanently. However, universal-shaft joints in agricultural machines are subject to extraordinary strain particularly with respect to axial forces which lead to the early destruction of such funnel-shaped end pieces of resilient material.

It is an object of the invention to render protective funnel-shaped or cylindrical end pieces over universal joints of shafts either partly resilient or rigid and spring-urged so as to yield to pressure exerted in axial and radial direction of the shaft.

It is also an object of this invention to provide a protective end piece which can be partially deformed only by pressure onto one side of the end piece's annular edge.

Another object of this invention is to provide a joint-protecting device which is effective even when the two parts of the universal joint have been disconnected from each other.

It is still another object of this invention to fix the radial distance of the end piece walls in such a manner that there is always enough space between these walls and the joint even when an additional overload clutch is used.

Other objects and advantages of the invention will be apparent from the following description in conjunction with the accompanying drawings, in which like reference numerals refer to like parts throughout the several figures, and wherein, FIG. 1 shows a side view in section of the preferred embodiment of the protective end piece according to the invention.

Figure 1:
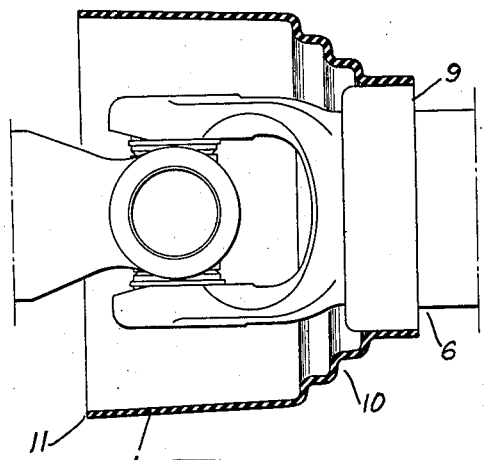

Referring now to the drawings more in particular, FIG. 1 illustrates the preferred embodiment of the protective end piece which is firmly attached to the protective tube 6. The portion of the end piece, which renders it resilient is the stepped portion 10. While the straight portion of the end piece 1 is not resilient, the stepped portion 10 can be deformed in various degrees when a force is either exerted upon the entire edge 11 of the end piece 1 or only at one part thereof.

Figure 2:
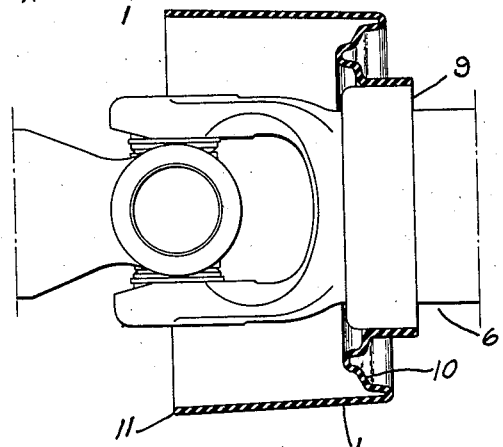
FIG. 2 is the same view, but with an end piece which has been pushed back in axial direction and whereby the stepped portion is inverted.

FIG. 2 shows the deformation of the end piece 1 in the stepped portion 10 when an axial force is exerted upon the entire edge 11 of the end piece 1. After the force is removed, the portion 10 will reassume its stepped configuration as shown in FIG. 1.

Figure 3:
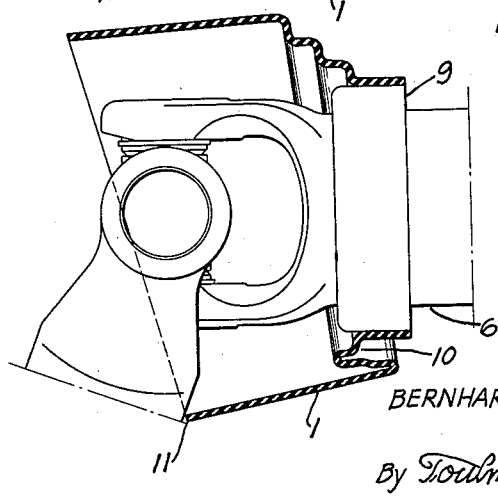
FIG. 3 shows a universal joint in which one part of the joint has been turned all the way to one side thereby distorting the protective device on this side only.

In FIG. 3 it is shown how the end piece 1 is shaped when a force is exerted on only one part of the annular edge 11. On the side where the force becomes effective, the stepped portion 10 is deformed, whereas the other side onto which no pressure is exerted remains practically in its normal position.

Figure 4:
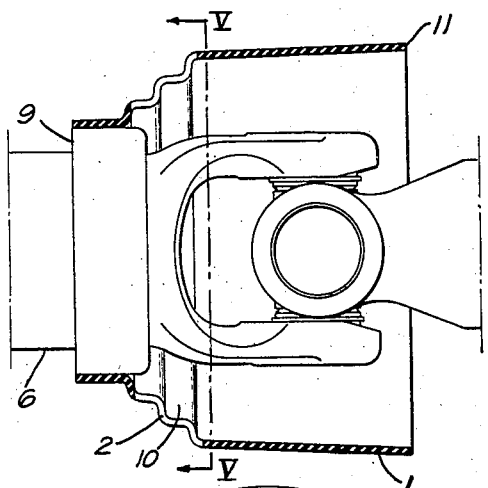
FIG. 4 shows a modification of the embodiment of FIG. 1 where the stepped section of the end piece is provided with spaced, radial slots.
Figure 5:
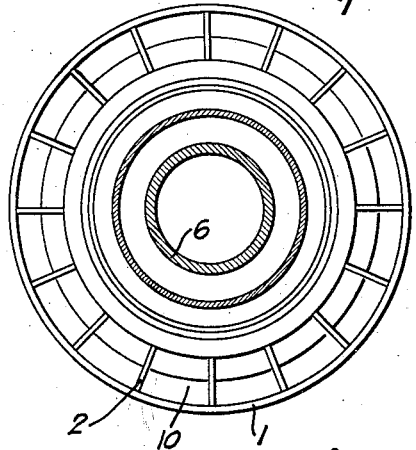
FIG. 5 is a section of the embodiment shown in FIG. 4 taken along line V—V in FIG. 4.

FIGS. 4 and 5 show a modification of the embodiment illustrated in FIG. 1 where the elasticity of the stepped portion 10 is increased by the provision of spaced radial slots 2.

Figure 6:
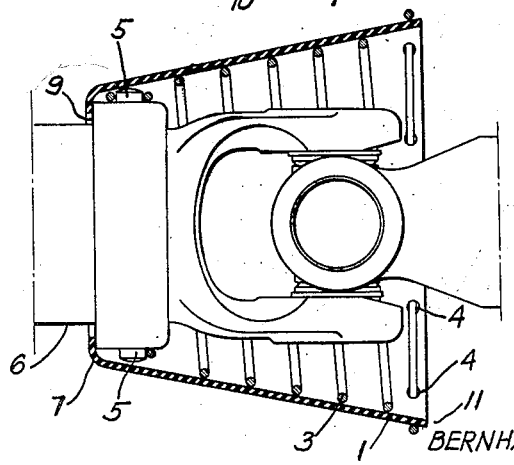
FIG. 6 shows another modification of the protective device in which a conical coil spring has been inserted into a rigid, axially shiftable funnel-shaped end piece.
Figure 7:
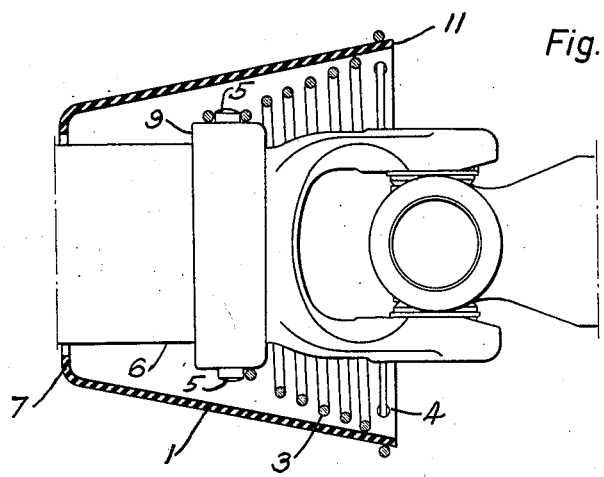
FIG. 7 shows the same embodiment illustrated in FIG. 6, but with the end piece pushed back against the pressure of the conical spring by an axially exerted force.

FIGS. 6 and 7 show an embodiment of the present invention in which the entire end piece 1 is rigid. The edge 7 engages behind the flanged end of the enlarged portion 9 of the protective tube 6 so as to be freely movable along the tube. In the normal position, the coil spring 3 which is anchored at one end of the projection 5 of the protective tube 6 and at the other end in apertures 4 at the wider end of the funnel-shaped end piece 1 holds the end piece by its pressure in such a manner that the edge 7 is urged against the enlarged portion 9 of the protective tube 6.

When an axial force is exerted upon the edge of the end piece 1, the spring 3 is compressed and the end piece 1 is pushed back, thereby assuming the position illustrated in FIG. 7.

Figure 8:
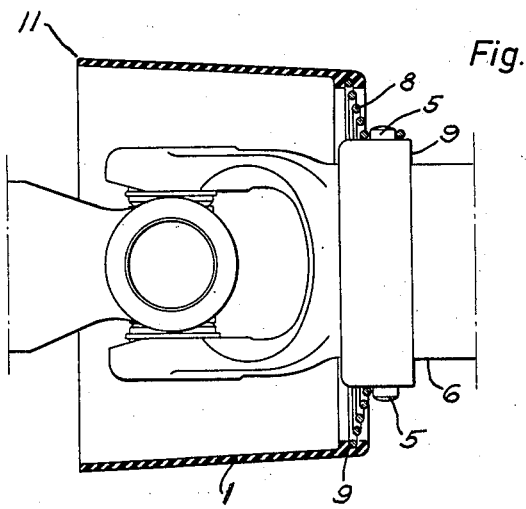
FIG. 8 shows still another embodiment of the present invention where the protective end piece is connected with the shaft cover by means of a coil spring.

In the embodiment shown in FIG. 8 the narrower end of the end piece 1 is made resilient by the provision of a short coil spring 8 between the narrower edge of the end piece 1 and the enlarged portion 9 of the protective tube 6. This short coil spring 8 is anchored in the groove 12 of the end piece 1 and on the projection 5 of the protective tube 6.

All embodiments of the protective device according to the present application have an end piece which is positioned on the shaft assembly so as to protect a universal joint. This end piece is either partly resilient or rigid and spring-urged so that it can yield in the presence of evenly or unevenly applied axial as well as radial pressure.

The embodiments shown in FIGS. 1 to 5 have an end piece where the connection between the end piece 1 and the protective tube 6 of the shaft assembly consists of a stepped, elastic portion 10. The elasticity of the stepped portion 10 can be increased by the use of a relatively soft material. On the other hand, the rigidity of the straight portion of the end piece 1 can be increased by fixing a sleeve hereto. The preferred means for increasing the elasticity of the stepped portion 10 is the provision of apertures 2 therein which are shown in FIGS. 4 and 5 as radial slots.

The embodiments shown in FIGS. 6 to 8 use rigid end pieces 1 in cooperation with coil springs 3 (in FIGS. 6 and 7) and 8 (in FIG. 8).

In the embodiment shown in FIGS. 6 and 7 the rigid end piece 1 is axially dislocated against the pressure of the coil spring 3 when axial forces are exerted upon the edge 11 of the end piece 1.

In the embodiment of FIG. 8 the coil spring 8 has the same function as the stepped portion 10 which is shown in FIGS. 1 to 4, i.e. making the connection between the end piece 1 and the protective tube 6 resilient. This embodiment is particularly advantageous to react to axial and radial external forces.

The protective device according to the present invention is extremely durable and can be used with great advantage with agricultural machines.

It will be understood that this invention is susceptible to modification in order to adapt it to different usages and conditions, and accordingly, it is desired to comprehend such modifications within this invention as may fall within the scope of the appended claims.

What is claimed is:

In combination with a universal joint shaft comprising a stationary tube surrounding said shaft on one side of the universal joint, said tube having an annular enlarged portion adjacent the universal joint, and a cylindrical protective end piece spacedly encompassing the universal joint and having a resilient stepped portion at one end thereof, said end piece being firmly mounted on said annular enlarged portion adjacent said stepped portion and having radial slots in the stepped portion whereby the yieldingness of said stepped portion is increased.

References Cited in the file of this patent

UNITED STATES PATENTS

| | | |
|---|---|---|
| 2,469,713 | Coleman | May 10, 1949 |
| 2,952,142 | Schroter et al. | Sept. 13, 1960 |
| 2,976,703 | Atkinson | Mar. 28, 1961 |

FOREIGN PATENTS

| | | |
|---|---|---|
| 780,930 | Great Britain | Aug. 7, 1957 |